Feb. 19, 1963   D. E. BOWN ETAL   3,078,144
METHOD FOR PREPARING PURIFIED TITANIUM TRICHLORIDE
Filed March 9, 1959

FIG. 1.

FIG. 2.

INVENTORS.
DELOS E. BOWN,
HENRY G. SCHUTZE,
BY ALBERT T. WATSON

Carl G. Ries
ATTORNEY.

3,078,144
METHOD FOR PREPARING PURIFIED TITANIUM TRICHLORIDE
Delos E. Bown and Henry G. Schutze, Baytown, Tex., and Albert T. Watson, Decatur, Ala., assignors, by mesne assignments, to Esso Research and Engineering Company, Elizabeth, N.J., a corporation of Delaware
Filed Mar. 9, 1959, Ser. No. 798,169
4 Claims. (Cl. 23—87)

This invention relates to a process for the preparation of purified titanium trichloride. More particularly, this invention relates to a process for the conversion of titanium tetrachloride into finely divided purified titanium trichloride.

This application is a continuation-in-part of application Serial No. 643,503, filed March 4, 1957, and entitled "Olefin Polymerization" by Delos E. Bown et al.

Titanium trichloride in a highly purified form is useful as a catalyst or a catalyst component in the conversion of hydrocarbons. Thus, when activated with a suitable activator such as an aluminum alkyl, it may be utilized in the polymerization of alpha olefins as disclosed in said parent application Serial No. 643,503. The titanium trichloride may also be utilized as such for the isomerization, dimerization, etc. of hydrocarbons as disclosed, for example, in copending Bown et al. application Serial No. 661,830, filed May 27, 1957, entitled "Conversion of Hydrocarbons."

Titanium trichloride is conveniently prepared by the partial reduction of titanium tetrachloride. Since titanium tetrachloride may also be reduced to titanium dichloride, it will be apparent that in the preparation of high purity titanium trichloride from titanium tetrachloride by selective reduction it is necessary to provide a method which will result in a product containing titanium trichloride contaminated with only minimized amounts of titanium tetrachloride or titanium dichloride, or both. This presents a serious problem in that titanium tetrachloride at elevated temperatures is a gas and is a liquid at ambient temperatures. Titanium trichloride and titanium dichloride, on the other hand, exist in solid form even at elevated temperatures. In accordance with the present invention, however, a process is provided for the preparation of highly purified titanium trichloride from titanium tetrachloride. Briefly, titanium tetrachloride is introduced as a gas or as a liquid or as a mixture of gaseous and liquid titanium tetrachloride into a reactor containing a reduction zone wherein a temperature within the range of about 600° to 1300° C. is maintained whereby the presence of gaseous titanium tetrachloride in the reduction zone is positively provided and whereby at least a portion of such titanium tetrachloride is selectively reduced to the violet form of titanium trichloride. The rate of flow of the titanium tetrachloride through the reactor should be such that the titanium trichloride product will be swept from the reduction zone substantially immediately after its formation. The resultant reaction mixture, immediately after removal from the reduction zone, is cooled to a temperature within the range of about 140° to about 250° C. and, immediately after cooling, the titanium trichloride product is separated from gaseous reaction products including still volatile titanium tetrachloride. Thereafter, if desired, the off-gas may be further cooled to effect condensation of the unreacted titanium tetrachloride which may then be separated from the remaining off-gases that are present in the reaction product.

In addition to the foregoing, the gaseous flow rate through the reduction zone is regulated to provide for only partial reduction of the vaporized titanium tetrachloride within the reduction zone. Thus, the gaseous flow rate should be adjusted to provide reduction of from about 2 to 50 volume percent of the gaseous titanium tetrachloride. Preferably, from about 2 to 10 percent of the vaporized titanium tetrachloride is reduced in the reduction zone. When this is done, the reduction of titanium tetrachloride to violet titanium trichloride is selective and, moreover, the titanium trichloride that is formed by the reduction is characterized by an extremely small particle size and very high surface area. The cooling step which follows immediately after the reduction step maintains the desired small particle size and high surface area of the titanium trichloride.

It will be understood that the reduction of the titanium tetrachloride may be accomplished solely by thermal reduction, as disclosed in copending Bown et al. application Ser. No. 643,676, filed March 4, 1957, now U.S. Patent No. 2,993,009, by providing a charge material wherein the sole reactive component is titanium tetrachloride.

The reduction may be also accomplished through the use of a reducing agent within the above indicated temperature range. Thus, aliphatic hydrocarbons may be utilized as disclosed in copending Bown et al. application Ser. No. 643,848, filed March 4, 1957. The reduction may be also effected with hydrogen as shown, for example, in parent application Ser. No. 643,503. These and other methods may be utilized for the reduction of the titanium tetrachloride.

It is within the scope of the present invention to conduct the reduction reaction in the presence of catalyst modifying agents; for example, aluminum chloride, ferric chloride, or chromic chloride, which form a cocrystal with titanium trichloride; and ethyl chloride or boron trifluoride, which may produce changes in the crystal structure of titanium trichloride; and vanadium pentachloride, vanadyl trichloride, or chromyl chloride, which are reduced together with the titanium tetrachloride to form cocatalysts.

The invention will be further illustrated with respect to the accompanying drawing wherein:

FIG. 1 is a schematic flow sheet illustrating one form of the present invention; and FIG. 2 is a schematic flow sheet illustrating another embodiment of the present invention.

Turning now to FIG. 1, there may be provided an elongated tube 10 provided with inlet lines 12, 14, and 16 and an intermediate quench line 18.

More specifically, the inlet line 12 controlled by a valve 20 and provided adjacent the reaction zone 10 with a suitable heating device 22 such as an electrical resistance heater may be a titanium tetrachloride charge line. In accordance with a preferred form of the invention, a reducing agent charge line 14 controlled by a valve 24 and provided with a suitable heater 26 is provided for the introduction of a reducing agent such as hydrogen. Optionally, the line 16 controlled by a valve 28 and provided with a suitable heater 30 is provided for the introduction of a suitable catalyst modifier such as aluminum chloride, boron trifluoride, etc.

As will be observed from the foregoing, each of the charge lines is provided with a preheater by which means the reactants may be heated to a temperature suitable to effect reaction when allowed to mix in reaction zone 10, in which case, no additional heat is introduced in zone 10. Alternatively, the preheater may only serve to facilitate the introduction of the reactants into reaction zone 10. In this case, reaction zone 10 is heated, with suitable means, to the desired reaction temperature, about 600° to 1300° C. but more preferably, to about 1000° C.

Within the reaction zone 10, that portion of the vaporized titanium tetrachloride which is reacted is reduced to solid purple titanium trichloride which rapidly nucleates on evolution in order to form solid particles of titanium trichloride. The crystal growth and nucleation is closely regulated in accordance with the present invention by controlling the quantities of reactants introduced into zone 10, by controlling the temperature gradient along zone 10, and by controlling the quenching of the reaction products in the quenching zone 34. In the quenching zone 34 the temperature is reduced as desired, but not below about 140° C., or otherwise titanium tetrachloride will condense. This may be accomplished through the introduction of a quench gas through a quench line 18 controlled by a valve 32. The quench gas may be a reducing agent such as hydrogen or an inert gas such as nitrogen, argon, etc.

It will be understood, of course, that polar active compounds such as oxygen or water are substantially completely excluded from the reaction zone. When a quench gas is employed, as shown in FIG. 1, the terminal portion of the reactor may be considered as a quench zone 34 containing a stream of finely divided titanium trichloride particles entrained in a gaseous medium. Substantially immediately after the quenching step, the above-identified suspension is resolved into a solid titanium trichloride phase and a gas phase through separation of the solids. Thus, a centrifugal cyclone type separator 36 is employed in accordance with the embodiment of the present invention illustrated in FIG. 1. With a separation process of this nature, the gaseous material is withdrawn from the cyclone by way of an outlet line 38 while the solid particulate titanium trichloride is accumulated at the base of the cyclone separator 36 in an accumulation leg 40. Preferably, the thus-accumulated titanium trichloride is maintained at a temperature above the boiling point of titanium tetrachloride by means of a suitable heater 42. As an optional feature, a purge gas such as nitrogen, argon, or hydrogen may be introduced at the base of the cyclone 36 by way of a line 44 controlled by a valve 46 in order to insure substantially complete separation of the solid titanium trichloride from the products of the reduction reaction.

The off-gases withdrawn from the cyclone 36 through the line 38 may be conducted by way of a line 48 to a cooling zone 50 wherein unreacted titanium tetrachloride may be selectively liquefied. From the cooler 50 the cooled material passes by way of a line 52 to a separation zone 54 wherein liquefied titanium tetrachloride is separated from the uncondensed gases. The uncondensed gases may be discharged from the separator 54 by way of the line 56. The condensed titanium tetrachloride is preferably recycled to the line 12 by way of the line 58.

The titanium trichloride which is recovered in the leg 40 is substantially completely free from titanium dichloride and titanium tetrachloride.

Recovery of the thus-prepared pure titanium trichloride may be accomplished, for example, by providing a slide valve 60 (shown schematically in the drawing) interconnecting the leg 40 with a conduit 62 leading to suitable containers for the titanium trichloride.

Another form of the present invention is shown in FIG. 2. In accordance with this embodiment, there is provided a boiler 100 to which titanium tetrachloride may be charged by a line 102 controlled by a valve 104.

Titanium tetrachloride vaporized in the boiler 100 passes by way of a transfer line 106 through a charge line 112 leading to a reaction zone 114. If desired, a suitable reducing agent such as hydrogen or an aliphatic hydrocarbon may be admixed with the volatilized titanium tetrachloride by way of a charge line 116 controlled by a valve 118 leading to the charge line 112. In similar fashion, a catalyst modifier such as aluminum trichloride or boron trifluoride may be introduced into the line 112 by way of a modifier charge line 120 controlled by a valve 122.

The reactor 114 may be of any desired construction. By way of example, the reactor 114 may comprise a cylindrical vessel which is provided with a suitable heating medium such as a silicon carbide electrical resistance type heater. The silicon carbide heater is illustrated in the drawing schematically by the numeral 124 and is schematically shown with leads 126 and 128 interconnecting the electrical resistance element in a suitable circuit. The heated portion of the silicon carbide heated is preferably at the top portion of the reactor 114. Preferably, but not as a matter of necessity, the silicon carbide heating element is surrounded by a jacket such as a quartz jacket 108 to prevent the deposition of the titanium trichloride on the heating element. Suitable means such as line 130 controlled by a valve 132 may be provided adjacent the bottom of the reactor 114, designated as the quench zone, for the introduction of a quench gas. The quench gas, as indicated, is utilized for the control of particle size.

With a reactor of this construction, the titanium tetrachloride may be heated within the reaction zone 114 to a temperature within the range of about 600° to 1300° C. in the presence, if desired, of a reducing agent introduced by way of the line 116 and a catalyst modifying agent introduced by the line 120.

Conversion products discharged from the reactor 114 to a transfer line 110 leading to a separation zone which, in this instance, may be a turbulent filtration zone 134. Thus, the filtration zone 134 may be provided with a cylindrical filter element 136 such as a so-called "micrometallic" filter having openings formed therein having an average diameter within the range of about 5 to 10 microns.

In accordance with this embodiment, the suspension of solid titanium trichloride in gaseous reaction products is resolved in the zone 134 by selectively withdrawing gaseous reaction products through the pores in the filter element 136 into a draw-off line 138. The finely divided titanium trichloride which cannot pass through the element 136 accumulates in a storage leg 140 where it is preferably maintained at a temperature above the boiling point of titanium tetrachloride by means of a heating coil 142. The thus-collected titanium trichloride substantially completely free from titanium dichloride and titanium tetrachloride may be recovered from the leg 140 through the provision of a suitable valve such as a slide valve 144 interconnecting the leg 140 with a conduit 146 leading to a suitable container for the purified product.

The off-gas withdrawn from the zone 134 by way of line 138 is passed through a cooler 148 in order to selectively liquefy the unreacted titanium tetrachloride. The cooled products are discharged from the cooler by way of a line 150 interconnecting with a dip leg 152 for returning the unreacted titanium tetrachloride to the boiler 100 and with a vent line 154 for the discharge of uncondensed gaseous materials. Preferably, a cooler 156 about the vent line 154 is provided in order to prevent loss of titanium tetrachloride through entrainment in the off-gases.

The invention will be further illustrated by the following specific examples which are given by way of illustration and not intended as limitations on the scope of this invention.

*Example I*

Titanium tetrachloride and hydrogen were separately heated to a temperature of about 1000° C. The thus-heated reactants were then charged to an unheated reaction zone in the molar ratio of about 0.5 mol of hydrogen per mol of titanium tetrachloride. The reaction product consisted essentially of hydrogen chloride and finely divided purple titanium trichloride.

*Example II*

A reactor for the continuous preparation of titanium trichloride was constructed substantially as shown in FIG. 2. In a first experiment, however, the transfer line 110 from the reactor 114 was directly connected with the cooler 148.

Titanium tetrachloride was boiled at the rate of about 38.8 pounds per hour and charged in vaporized form to the reactor 114. At the same time, about 8.8 cubic feet per hour of hydrogen was charged by way of the hydrogen charge line 116.

The reaction zone 114 was provided with a commercial silicon carbide electrical resistance element 124 which was utilized to maintain a reaction temperature of about 1200° C. in the reaction zone.

With the indicated arrangement, the titanium trichloride that was formed by the reduction reaction was entrained in unreacted titanium tetrachloride condensed in the cooler 148 and was thus returned to the boiler 100.

After about 9 hours of reaction in this fashion, the slurry of solid titanium trichloride in titanium tetrachloride which was in the boiler 100 was recovered and the titanium tetrachloride was subjected to a distillation operation in order to remove as much of the unreacted titanium tetrachloride as possible. Thereafter, the titanium trichloride was dried on a rotating evaporator at a temperature of about 100° to 120° C. for about 3 hours. The dried material was washed with dry n-heptane and again dried.

On analysis, it was found that the product had a bulk density of about 0.32 gram per cc. and contained less than about 0.5 weight percent of $TiCl_2$ but about 1.2 weight percent of $TiCl_4$.

*Example III*

In a second run, a cyclone separator of the type illustrated in FIG. 1 without the filter 136 was interposed intermediate the transfer line 110 of FIG. 2 and the cooler 148. Reaction conditions in the reaction zone 114 were substantially identical with those described above except the titanium tetrachloride boil-up rate was 15.3 pounds per hour. In this instance, however, the suspension of solid titanium trichloride in the reaction product discharged by line 110 into the cyclone separator and resolved into a solid titanium trichloride fraction and a gas fraction. The titanium trichloride fraction, without further treatment, had a bulk density of about 0.32 gram per cc., contained less than about 0.5 weight percent $TiCl_2$ and, significantly, only about 0.2 weight percent of $TiCl_4$.

*Example IV*

In Example IV the apparatus was substantially that shown in FIG. 2 and the product titanium trichloride was recovered by means of a "micro-metallic" filter 136. Reaction conditions within the zone 114 were as described above except the titanium tetrachloride boil-up rate was 9.0 pounds per hour. The suspension of finely divided solid titanium trichloride and gaseous products discharged from the zone 114 by the line 110 were charged to the filter 136 and there separated into a solid titanium trichloride phase and a gas phase. The titanium trichloride formed in this fashion had a bulk density of about 0.5 gram per cc., a titanium dichloride content of less than about 0.5 percent, and a titanium tetrachloride content of about 0.15 weight percent.

*Example V*

In Example V the apparatus was substantially that shown in FIG. 2. The reaction conditions within zone 114 were as described in Example II, except aluminum chloride was added by way of line 120 at a rate of 57 grams per hour. The product formed in this fashion was a modified titanium trichloride which contained cocrystallized aluminum chloride. The empirical formula was $TiCl_3$–0.32 $AlCl_3$. The bulk density was 0.80 gram per cc.

Having described our invention, what is claimed is:

1. A method for preparing finely divided violet titanium trichloride crystals substantially free of titanium dichloride and titanium tetrachloride which comprises continuously passing an admixture of hydrogen and titanium tetrachloride as reactant gases through a reaction zone at a temperature within the range from about 600° C. to about 1300° C., thereafter introducing a quench gas under conditions to reduce the effluent from said reaction zone to a temperature within the range from about 140° C. to about 250° C., the reactant and quench gas flow rates and temperatures being so regulated as to produce a reduction of from about 2 to about 50 volume percent of said titanium tetrachloride in said reaction zone to finely divided violet crystals of titanium trichloride, the amount of hydrogen feed being in excess of that reacted in the reduction of titanium tetrachloride to titanium trichloride, and immediately after said quenching step, separating said titanium trichloride crystals from the effluent gases.

2. A method in accordance with claim 1 further comprising the step of cooling the gases remaining after separation of titanium trichloride to an extent sufficient to liquefy unreacted titanium tetrachloride, and returning said titanium tetrachloride to the reaction zone.

3. A method in accordance with claim 1 further comprising the step of continuously passing a volatilized catalyst modifying agent through said reaction zone in admixture with said hydrogen and said titanium tetrachloride whereby a cocrystalline product of the modifying agent and said titanium trichloride is formed.

4. A method in accordance with claim 3 wherein the modifying agent is aluminum chloride.

References Cited in the file of this patent

UNITED STATES PATENTS

| | | |
|---|---|---|
| 2,657,124 | Gaucher | Oct. 27, 1953 |
| 2,681,273 | Odell | June 15, 1954 |
| 2,684,896 | Coghlan | July 27, 1954 |
| 2,720,281 | Ruehrwein et al. | Oct. 11, 1955 |
| 2,767,233 | Mullen et al. | Oct. 16, 1956 |
| 2,783,142 | Singleton et al. | Feb. 26, 1957 |
| 2,874,040 | Ferraro | Feb. 17, 1959 |
| 2,886,560 | Weber et al. | May 12, 1959 |
| 2,905,645 | Anderson et al. | Sept. 22, 1959 |
| 2,962,362 | Moorman | Nov. 29, 1960 |

OTHER REFERENCES

Mellor: Comprehensive Treatise on Inorganic and Theoretical Chemistry, vol. 7, pp. 75–76, Longmans Green and Co., New York (1927).

Barksdale: "Titanium," pp. 80–82, The Ronald Press Co., New York (1949).

Funaki et al.: Chemical Abstracts, vol. 50, No. 21, p. 15311b, Nov. 10, 1956.

Sinha: Jour. of Applied Chemistry, vol. 7, No. 2, pp. i–92, February 1957.

Siddhanta et al.: Chemical Abstracts, vol. 49, No. 8, pp. 5789–90, Apr. 25, 1955.

Sherfey: Jour. of Research of the Nat. Bur. of Stds., vol. 46, No. 4, pp. 299–300 (April 1951).